Figures 5, 6, 7, 8, 9:
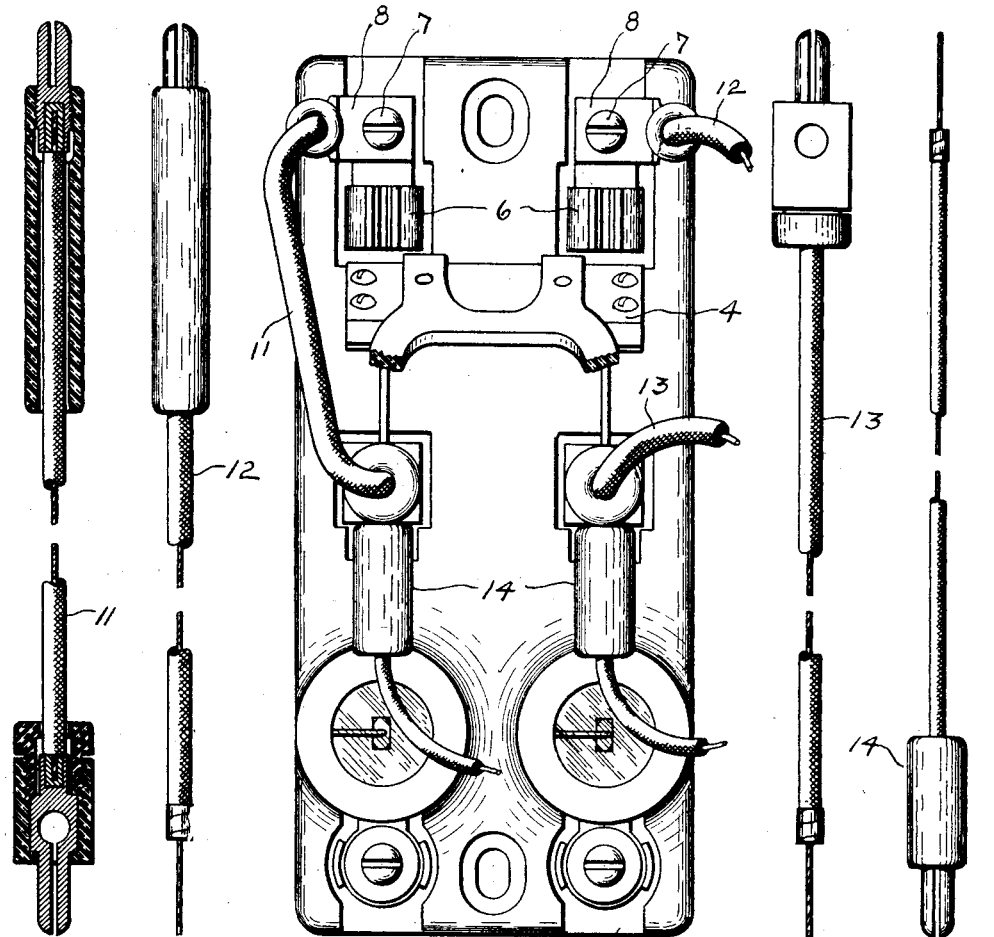

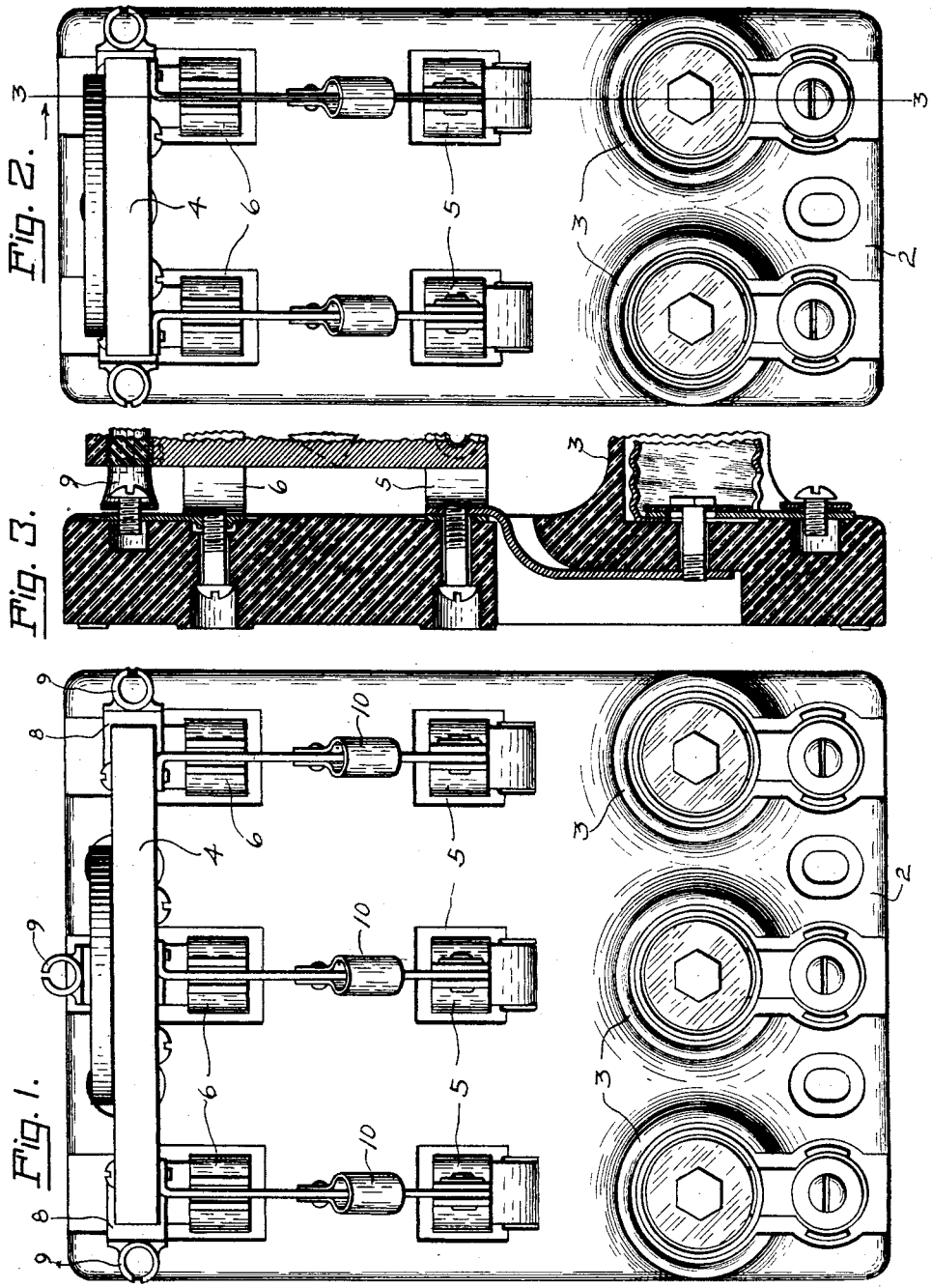

J. SACHS.
METER TESTING SWITCH.
APPLICATION FILED MAY 5, 1915.

1,181,484.

Patented May 2, 1916.
2 SHEETS—SHEET 2.

Witnesses
Otto Hilton
Franz Volker

Inventor
Joseph Sachs.
By
Attorney

UNITED STATES PATENT OFFICE.

JOSEPH SACHS, OF HARTFORD, CONNECTICUT.

METER-TESTING SWITCH.

1,181,484.     Specification of Letters Patent.     Patented May 2, 1916.

Application filed May 5, 1915. Serial No. 26,023.

*To all whom it may concern:*

Be it known that I, JOSEPH SACHS, a citizen of the United States, residing at Hartford, in the county of Hartford and State of Connecticut, have invented certain new and useful Improvements in Meter-Testing Switches, of which the following is a specification.

This invention relates to what I may for convenience call a meter testing switch and may be of the plain switch type or of cut out switch type, and if of cut out switch type, it may be provided with, for instance, a fuse cut out device of any desired character. Furthermore the cut out device may be separate from the movable switching parts but mounted on the same base or the fused cut out devices may be carried directly by the movable switch parts. Ordinary plain and cut out switches of various types including the constructions just mentioned, are well-known in the art. I have selected one of many forms of switches suitable for my purpose and for the embodiment therein of my invention, but it will be understood that my invention may be incorporated in many other forms of switch devices.

One of the primary purposes of my invention is to provide a switch controlling a load circuit in which a meter is included, so that a test may be made of said installed meter by connecting in series therewith and with the load or with such other load as may be desired, a testing meter or standard meter and to provide means whereby this can be done without interrupting the current supply to the customer from the service. As will be understood where a switch of either plain or cut out type is used as a service switch to control the circuit served, such switch is connected at one end to the service wires whether they be of a two or a three-wire circuit and at the other end connection is made to a meter and the load wires.

In order that the installed meter may be tested and checked up with the testing meter on the customer's load, it is necessary that there be inserted in the circuit in series with the meter and the load, the testing meter and such other devices as may be necessary. To accomplish this result my meter testing switch is provided with means to coact with testing devices, so that these may be connected across the parts at which the switch opening or rupturing occurs, and when these testing devices are so connected, the switch may be opened, but the circuit to the installed meter and the customer's load instead of being interrupted thereby, will still be continued through the main testing circuit and the testing instruments and devices such as for instance, the by-pass or jumper.

Figure 4:
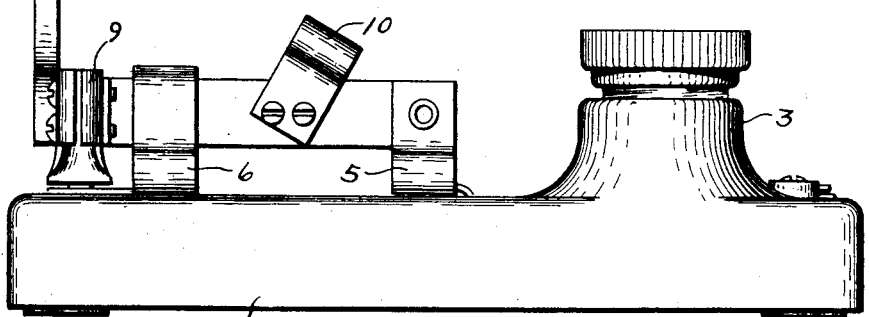

Referring to the drawings: Figure 1 is a face view of a three-pole plug cut out switch involving my invention. Fig. 2 is a similar view of a two-pole plug cut out switch also involving my invention. Fig. 3 is a longitudinal section on the line 3—3 of Fig. 2 looking in the direction of the arrow. Fig. 4 is a side view of either said two pole or the three pole cut out switch. Fig. 5 is a face view of the cut out switch shown in Fig. 2 with certain testing parts and devices associated therewith, the switch being shown in open or testing position. Fig. 6 is a detail view in section of a by-pass or jumper. Fig. 7 is a view of a main testing plug and its connected flexible cable. Fig. 8 is a view of another form of main testing plug and its connected cable, this form being provided with a potential plug receiving socket. Fig. 9 is a view of a potential testing plug and its connected cable.

Like characters refer to like parts throughout the several figures.

As will be evident it is not a matter of consequence as to how many poles the meter testing switch may have. I have shown one with two poles and another with three poles. Except in this regard the two are identically the same, and for this reason I will use the same characters to denote corresponding parts.

Referring to Figs. 1 to 5 the numeral 2 denotes a base generally of some suitable insulating material such as porcelain. This base supports both the cut out and the switching device. The appliance shown in Fig. 1 comprises three cut out elements 3 while that shown in Figs. 2 and 5 has only two of such cut out elements. The switching device is denoted in a general way by 4. In Fig. 1 it has three poles or switching elements, and in Figs. 2 and 5 it has only two. The switching elements, arms or blades of the two switches may be connected mechanically but insulated electrically by any suitable means. Each blade or switching element of each switching device 4 has a pair of coöperative contacts, one as 5 being the supporting or hinging contact and the other as 6 being the rupturing or breaking contact. The several contacts and the cut out elements 3 are as shown supported by the base 2. The foregoing is a concise description of switches which in this particular showing are cut out switches which are satisfactory for my purpose. It will be evident that it is not imperative that a cut out be combined with a switch. It, of course, will be understood that each cut out element is connected electrically with an adjacent switching element, so that the cut out element and the respective switching elements so connected are in series.

I provide means whereby I can by-pass around that portion of the switch which is used for rupturing or opening the circuit. It will be understood that when I speak of that portion of the switch used in rupturing or opening the circuit, I do not mean to imply any particular part of the switch or its elements, but intend to convey the fact that by-passing is accomplished around the breaking or rupturing points of the switch, so that when these points are separated or electrically disconnected a current path is still provided from the so separated parts through the by-pass or the testing circuit. That is to say when the movable member or element or an equivalent part of the switch is open, current in accordance with my invention will be passed through the testing circuit from the service to the load or meter side of the switch. A switch pole is by-passed when the movable switching element thereof is in open condition and that when the switch is a multi-polar switch, each pole of the switch will have provision for the current flow across the break or rupture whether it be through a direct by-pass testing device or through the main testing circuit, which in itself may be considered a by-pass and may be called the main testing circuit by-pass.

Inasmuch as the cut out performs no particular function in testing but subserves its ordinary well-known function, it will be unnecessary to describe its connection in the circuit. Each switching element, blade or arm of the switch device has its coöperative rupturing contact. This rupturing contact is provided with wire connecting means so that to each of these contacts there may be connected one of the load circuit wires in one or more of which a meter coil is inserted of the installed meter. Electrically connected with each of the rupturing contacts 6 is a means of suitable kind for receiving or coacting with a terminal such as a plug of a testing device whether it be the direct by-pass hereinafter more fully described, or the by-passing main testing circuit. In the particular showing these testing device receiving means associated with the rupturing contacts 6 form a part of the wire connecting means 7 thereof, and in fact are as shown the washers 8 provided with the socket pieces 9. As will be readily understood instead of using these washers with their socket parts, I may use other means for the purpose.

Each of the switching elements or blades of the switching device 4 is equipped with suitable means for receiving or coacting with the terminal of a testing device and the socket piece 10 answers satisfactorily in this connection, this being made of metal and secured to the blade in any desired manner as by one or more screws. It will be understood that these testing device sockets 10 or other analogous devices or means need not essentially be connected to the blade or movable member of the switching element but may if desired, be connected at any other point to which the blade is supported. That is to say there is provision for connecting a testing instrument to the service side of a switching element.

For testing purposes I use certain adjuncts, among which is a direct by-pass or jumper as 11. This direct by-pass or jumper consists of a flexible cable to one end of which is an insulating handled plug terminal and at the other end of which is another insulating handled plug terminal, which latter, however, is also provided with a socket to receive a volt plug. For the connection of the main testing circuit I preferably provide two forms of testing plugs with their respective connected cables, one form being like that denoted by 12 and consisting of a plug terminal with its insulating jacket secured to the end of the testing cable and the other being denoted by 13 and consisting of the plugging terminal with its insulating handle and socketed to receive the potential testing plug and cable 14. The potential testing plug device consists of a plug terminal with its insulating handle suitably connected to a cable. In testing the number of each of these particular testing devices used will depend upon the character of the circuit; that is to say, whether it be a two-pole or a three-pole or a circuit of any other polarity. In the ordinary two-pole circuit for instance, there would be used one direct by-pass like 11, one main testing plug and cable like 12, one main testing plug and cable like 13, and two potential testing plugs and cables like 14.

In order to illustrate the manner in which my meter testing switch appliance is used for testing, reference will be had to Fig. 5 which shows the two-wire appliance of Fig. 2 conditioned with its testing appurtenances to test the meter installed in conjunction therewith. While the switch device is still closed the direct jumper or by-pass 11 has been inserted across from the rupturing contact 6 to the complemental blade of the switch device 4 in that particular pole. There is then inserted the testing plug device and its cable 12 which is seated in a socket link 9 of the rupturing contact on the other pole of the circuit. The main testing plug 13 is then inserted into the socket 10 on the blade complemental with the last mentioned rupturing contact. If desired the potential testing plugs may now be inserted into each of the receiving sockets of the testing plug 13, and one terminal of the direct by-pass 11 or this may be done later. However, after the by-pass 11 has been placed and provided a path around the rupturing parts in one wire of the circuit and the main testing circuit with its testing meter and resistance or other devices necessary has been connected across in the manner stated, the rupturing parts of the other pole of the circuit, then the switch may be opened separating the rupturing ends of the blade of each pole from its complemental rupturing contact 6 and opening the connection through the switch. Such opening of the connection through the switch, however, does not interrupt the current flow from the service end of the switch to the load and meter end, as such flow is now through the direct by-pass testing device 11, and the main testing circuit of which the terminals are the testing devices 12 and 13. Under this condition and arrangement of the parts, the current now passes, instead of through the switch, around the switch and the installed meter and load is now in series with the testing circuit in which are included the testing meter resistance, etc. After the test is finished the switch is closed and the testing appurtenances removed from their connection.

What I claim is:

1. A meter testing switch comprising a switching element including a movable member and terminals coöperative therewith, said switching element being connectible in series with a meter and with a load, and means directly associated with said switching element and electrically connected to said terminals when said switch is open, for receiving the terminals of a testing circuit whereby upon the opening of said switch for testing purposes, said testing circuit will be electrically in series with said meter and load.

2. A multi-polar testing switch comprising switching elements with their respective terminals, said switch elements being connectible in series with a meter and with a load, each pole having a movable member to open and close the same, one of said movable members constituting a load-controlling member, and means associated with the terminals of the switching element of one pole, for receiving the terminals of testing devices to place the testing circuit electrically in series with the meter and the load and means to connect across another pole of the switch when the switch is opened for testing purposes.

3. A multi-polar knife blade switch connectible to a circuit including a meter coil and load, said switch constituting a load controlling switch to normally open and close the connection with said circuit, said switch being provided with means for electrically connecting across opposite ends of each switching element thereof whereby when said switch is opened for testing purposes, the testing circuit will be electrically in series with the circuit including the installed meter and the load.

4. A switch connectible at one end to a service and at the other end to a load and a meter, said switch having means directly associated with the switching element in each pole, for receiving testing devices whereby when said switch is open for testing purposes, current will pass around the switch through said testing devices.

5. A meter testing switch connectible at one end to a service and at the other end to a meter and a load, said switch having directly associated therewith means for connecting, at will, across the switch-rupturing points, a testing circuit whereby when said switch is opened, current will pass through said testing circuit.

6. A meter testing switch comprising stationary contacts and a movable load-controlling member coacting with the stationary contacts, and means associated with said switch for detachably receiving the terminals of a testing circuit, the testing circuit having included therein a testing meter, whereby when said testing circuit is electrically connected as aforesaid, said switch may be opened for thus permitting current to pass through the testing circuit.

7. In a meter testing switch, a plurality of switching elements, one of which constitutes a load-controlling element, each having means for receiving the terminals of testing devices, said means being located on each side of the rupturing point and the testing device receiving means associated with at least one of said switching elements being adapted to receive the terminals of a testing circuit whereby when said switch is opened, said testing circuit will be included in series with the circuit controlled by said switch.

8. A multi-polar switch having load-controlling means and having terminals at opposite ends of each of its poles, the terminals at one end being connectible with a meter and with a load and the terminals at the other end being connectible with the service, and means for interposing at will a testing circuit in one pole between the terminals thereof, and means for by-passing at will between the terminals of another pole whereby the switch can be opened without interrupting current supply to the load.

In testimony whereof I affix my signature in presence of two witnesses.

JOSEPH SACHS.

Witnesses:
L. L. MARKEL,
HEATH SUTHERLAND.

Copies of this patent may be obtained for five cents each, by addressing the "Commissioner of Patents, Washington, D. C."